US008678581B2

(12) United States Patent
Blum

(10) Patent No.: US 8,678,581 B2
(45) Date of Patent: Mar. 25, 2014

(54) ATTACHABLE ELECTRO-ACTIVE LENS SYSTEMS

(75) Inventor: Ronald D. Blum, Roanoke, VA (US)

(73) Assignee: PixelOptics, Inc., Roanoke, VA (US)

( * ) Notice: Subject to any disclaimer, the term of this patent is extended or adjusted under 35 U.S.C. 154(b) by 70 days.

(21) Appl. No.: 13/085,562

(22) Filed: Apr. 13, 2011

(65) Prior Publication Data

US 2011/0249230 A1 Oct. 13, 2011

Related U.S. Application Data

(60) Provisional application No. 61/323,406, filed on Apr. 13, 2010.

(51) Int. Cl.
*G02C 1/00* (2006.01)
*G02C 11/06* (2006.01)

(52) U.S. Cl.
USPC .......................... 351/158; 351/159.39; 345/8

(58) Field of Classification Search
USPC .......... 351/159.39, 159.4, 158; 359/237–324, 359/630–633; 345/7, 8
See application file for complete search history.

(56) References Cited

U.S. PATENT DOCUMENTS

| 7,048,370 | B2 * | 5/2006 | Starner et al. ..................... 351/47 |
| 7,484,847 | B2 * | 2/2009 | Fuziak, Jr. ..................... 351/158 |
| 2002/0089639 | A1 | 7/2002 | Starner et al. |
| 2008/0106694 | A1 * | 5/2008 | Blum et al. .................... 351/158 |
| 2009/0251660 | A1 * | 10/2009 | Figler et al. .................... 351/158 |
| 2009/0296044 | A1 | 12/2009 | Howell et al. |
| 2010/0271587 | A1 * | 10/2010 | Pavlopoulos ................. 351/158 |

FOREIGN PATENT DOCUMENTS

| JP | 56111828 | 9/1981 |
| WO | WO 0245044 | 6/2002 |
| WO | WO 03090611 | 11/2003 |

OTHER PUBLICATIONS

PCT International Search Report for International Application No. PCT/US11/32264, mailed Jun. 15, 2011, 5 pages.
Written Opinion for International Application No. PCT/US11/32264, mailed Jun. 15, 2011, 8 pages.

* cited by examiner

*Primary Examiner* — Darryl J Collins
(74) *Attorney, Agent, or Firm* — Sterne, Kessler, Goldstein & Fox P.L.L.C.

(57) ABSTRACT

Systems and methods regarding spectacle systems are provided including base lens units and attachable lens units. A spectacle system may include a base lens unit with a first lens, a frame configured for wearing the base lens unit on a user, and a first attachment mechanism. The spectacle system may also include an attachable lens unit with a second lens and a second attachment mechanism configured to join with the first attachment mechanism. A communication mechanism may also be included that is configured to communicate data, instructions and/or electrical power between the base lens unit and the attachable lens unit. Either or both of the first lens and the second lens may include an electro-active lens. The attachable lens unit may include a variety of additional functions such as an electronic display, a camera, an active shuttering lens, and an active polarizing lens, which may also be powered by the base lens unit.

20 Claims, 5 Drawing Sheets

ATTACHABLE ELECTRO-ACTIVE LENS SYSTEMS

CROSS-REFERENCES TO RELATED APPLICATIONS

This application claims the benefit under 35 USC 119(e) to provisional application Ser. No. 61/323,406 filed Apr. 13, 2010, the contents of which are incorporated herein by reference in their entirety.

BACKGROUND OF THE INVENTION

The present subject matter deals generally with the spectacle devices including electro-active lenses. Electro-active lenses can be any lenses capable of adjusting, changing or tuning a provided optical power, or other optical effect, through the application of electricity. For example, U.S. Pat. No. 5,712,721, U.S. Pat. No. 6,517,203 and U.S. Pat. App. Pub. No. 2009/0256977, each describe exemplary electro-active lenses and spectacles, and are hereby incorporated by reference in their entireties.

BRIEF SUMMARY OF THE INVENTION

The present subject matter provides systems and methods for electro-active spectacle systems including, among other features, removable lens units. Aspects of the present invention provide electro-active lens systems using a base lens system and one or more attachable lens systems. Aspects of the present invention may also provide electro-active spectacle lenses that can provide the base lens system or platform for a user. In embodiments, the electro-active lens base system may be configured to provide vision correction for a user and may include controlling electronics. Further aspects of the present invention may provide one or more additional add-on lens systems that may be configured to attach to, and/or detach from, the base electro-active lens system. The add-on lens systems may be configured to provide enhanced electro-active capability for a user and may be powered and/or controlled by electronics included in the base system.

In embodiments, exemplary spectacle systems may include a base lens unit and an attachable lens unit. At least one of the base lens unit and the attachable lens unit may include an electro-active lens. The base lens unit may include a first lens, a frame configured for wearing the base lens unit on a user, and/or a first attachment mechanism. Attachable lens units may be provided including a second lens and a second attachment mechanism configured to join with the first attachment mechanism. A communication mechanism may also be included that is configured to communicate at least one of data, instructions and electrical power between the base lens unit and the attachable lens unit.

In embodiments, the base lens unit may include an electro-active lens and the base lens unit may include an electrical power source for the electro-active lens. The communication mechanism may also be configured to provide electrical power from the base lens unit to the attachable lens unit.

In further embodiments, the attachable lens unit may include an electro-active lens and the communication mechanism may be configured to provide electrical power from the base lens unit to the attachable lens unit.

In embodiments, the attachable lens unit may include at least one of an electronic display, a camera, an active shuttering lens, and an active polarizing lens, and the communication mechanism may be configured to provide instructions and electrical power from the base lens unit to the attachable lens unit.

In embodiments, the attachable lens unit may include an electro-chromatic lens, and the communication mechanism may be configured to provide electrical power from the base lens unit to the electro-chromatic lens.

In embodiments, at least one of the base lens unit and the attachable lens unit may be configured to communicate with a remote computer system, for example via a physical interface and/or wireless communication.

In embodiments, the communication mechanism may include at least one of a Standard, Mini, and Micro USB plug.

In embodiments, the first attachment mechanism may join with the second attachment mechanism via a magnet, and the communication mechanism may be configured to communicate electrical power between the base lens unit and the attachable lens unit via an electrical contact joined by the magnet.

In embodiments, the base lens unit may be configured to provide the user with at least one of a hearing aid capability and a radio communication capability, e.g. wireless two-way network communication, am radio, fm radio, etc.

According to further aspects of the invention, an attachable lens device may include an electro-active lens, an attachment mechanism configured to join the attachable lens device to a base lens unit, and a communication mechanism configured to communicate at least one of data, instructions and electrical power between the attachable lens device and the base lens unit.

In embodiments, the communication mechanism of the attachable lens device may be configured to receive electrical power from the base lens unit.

In embodiments, the attachable lens device may include at least one of an electronic display, a camera, an active shuttering lens, an active polarizing lens, an active magnifying lens, and the communication mechanism may be configured to receive instructions and electrical power from the base lens unit.

In embodiments, the electro-active lens of the attachable lens device may include an electro-chromatic lens, and the communication mechanism may be configured to receive electrical power from the base lens unit.

In embodiments, the attachable lens device may include a microprocessor configured to communicate with a remote computer system. The communication mechanism may include at least one of a Standard, Mini, and Micro USB plug.

In embodiments, the attachment mechanism of the attachable lens device may join with the base lens unit via a magnet, and the communication mechanism may be configured to communicate electrical power between the base lens unit and the attachable lens device via an electrical contact joined by the magnet.

In embodiments, the attachable lens device may include a camera, and the communication mechanism may be configured to communicate image data from the attachable lens device to the base lens unit.

In embodiments, the attachable lens device may include at least one of an electronic display, a camera, an active shuttering lens, and an active polarizing lens, and the communication mechanism may be configured to receive instructions for the at least one of an electronic display, a camera, an active shuttering lens, and an active polarizing lens from the base lens unit.

According to yet further aspects of the invention, a spectacle frame device may include a base lens attachment mechanism configured to hold a first lens, a removable lens attachment mechanism configured to removably join a removable lens unit including a second lens to the spectacle frame device, and a communication mechanism configured to communicate at least one of data, instructions and electrical power between the spectacle frame device and the attachable lens unit.

In embodiments, the spectacle frame device may include an electrical power source, and the communication mechanism may be configured to provide electrical power from the spectacle frame device to the attachable lens unit. In embodiments, the first lens of the spectacle frame device may be an electro-active lens powered by the electrical power source. In embodiments, the second lens removable lens unit may be an electro-active lens powered by the electrical power source.

In embodiments, the spectacle frame device may include a control device, and the communication mechanism may be further configured to provide instructions from the spectacle frame device to the attachable lens unit. In embodiments, the communication mechanism may be further configured to receive data from the attachable lens unit.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION OF THE INVENTION

Figure 1:
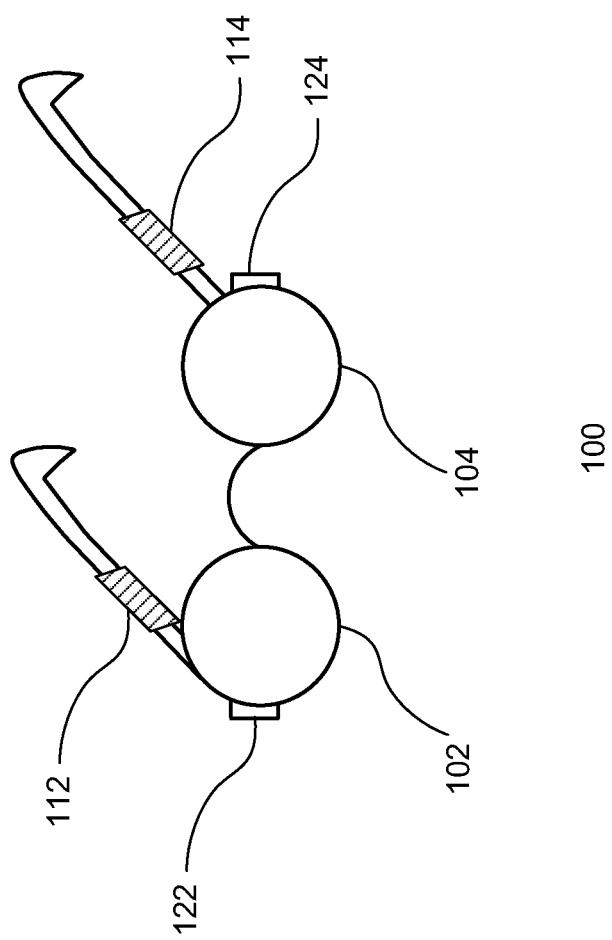
FIG. 1 depicts aspects of an exemplary spectacle system according to an embodiment of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

As discussed herein, and in the incorporated references, electro-active lenses may include one or more electro-active layers, zones and/or regions. An "electro-active zone" can include or be included in an electro-active structure, layer, and/or region. An "electro-active region" can be a portion and/or the entirety of an electro-active layer. An electro-active region can be adjacent to another electro-active region. An electro-active region can be attached to another electro-active region, either directly, or indirectly with, for example, an insulator between each electro-active region. An electro-active layer can be attached to another electro-active layer, either directly, or indirectly with, for example, an insulator between each electro-active layer. "Attaching" can include bonding, depositing, adhering, and other well-known attachment methods.

A "controller" can include or be included in a processor, a microprocessor, an integrated circuit, an IC, a computer chip, and/or a chip. A "refractor" can include a controller. An "auto-refractor" can include a wave front analyzer.

"Near distance refractive error" can include presbyopia and any other refractive error needed to be corrected for one to see clearly at near distance. "Intermediate distance refractive error" can include the degree of presbyopia needed to be corrected an intermediate distance and any other refractive error needed to be corrected for one to see clearly at intermediate distance. "Far distance refractive error" can include any refractive error needed to be corrected for one to see clearly at far distance. "Near distance" can be from about 6 inches to about 24 inches, and more preferably from about 14 inches to about 18 inches. "Intermediate distance" can be from about 24 inches to about 5 feet. "Far distance" can be any distance between about 5 feet and infinity, and more preferably, infinity. "Conventional refractive error" can include myopia, hyperopia, astigmatism, and/or presbyopia. "Non-conventional refractive error" can include irregular astigmatism, aberrations of the ocular system, and any other refractive error not included in conventional refractive error. "Optical refractive error" can include any aberrations associated with a lens optic.

In certain embodiments, a "spectacle" can include one lens. In other embodiments, a "spectacle" can include more than one lens. A "multi-focal" lens can include bifocal, trifocal, quadrafocal, and/or progressive addition lens. A "finished" lens blank can include a lens blank that has finished optical surface on both sides. A "semi-finished" lens blank can include a lens blank that has, on one side only, a finished optical surface, and on the other side, a non-optically finished surface, the lens needing further modifications, such as, for example, grinding and/or polishing, to make it into a useable lens. "Surfacing" can include grinding and/or polishing off excess material to finish a non-finished surface of a semi-finished lens blank.

As used herein, "attachment mechanisms" may include, without limitation, various mechanical, magnetic, electromagnetic, and other adhesive means suitable to attach and/or detach attachable lens units, and the like, to and/or from a base lens unit, spectacle frame etc. In embodiments, various attachment mechanisms may provide for convenient joining of an attachable lens unit to a base lens unit, and may also provide for the detachment and/or rejoining of the units.

FIG. 1 illustrates an exemplary electro-active spectacle 100 in accordance with an aspect of the present invention. The electro-active spectacles 100 may include two electro-active lenses 102, 104. As discussed herein, electro-active lenses, such as lenses 102, 104, may include one or more electro-active layers, zones and/or regions. Electro-active lenses, such as lenses 102, 104, may be configured to correct for, for example, distance refractive error, intermediate distance refractive error, far distance refractive error, conventional refractive error, non-conventional refractive error, optical refractive error, and combinations thereof known to those of skill in the art. The electro-active lenses, such as lenses 102, 104, may be any lenses capable of adjusting, changing or tuning a provided optical power through the application of electricity.

It should be understood that, although the electro-active spectacles 100 are illustrated as fully rimmed spectacles for simplicity, the invention is not limited to such specific configurations. For example, spectacles according to aspects of the invention may be fully rimmed, partially rimmed or rimless spectacles.

The electro-active spectacles 100 may include a first electronic module 112 and a second electronic module 114. The first electronic module 112 may include a controller to govern operation of a first electro-active lens 102 and the second electronic module 114 can include a controller to govern operation of a second electro-active lens 104. Alternatively, the electro-active spectacles 100 can include a single electronic module to govern operation of both electro-active lenses 102, 104. Additionally, one or more permanent and/or removable electrical power source (not shown) may be included in electro-active spectacles 100, such as, for example, removable batteries, inductive charging batteries, etc.

The voltages to create the electric field used in electro-active lenses may be small, hence, the temples of the frames may be designed to allow for the insertion and extraction of miniature bulk batteries which provide the necessary power. The batteries may be connected to the wire bundles through a multiplexing connection also contained in the frame temples. In another embodiment, conformal thin film batteries may be attached to the surface of the frame temples with an adhesive that allows them to be removed and replaced when their charge is dissipated. Other embodiments may include an AC, or other, adapter with an attachment to the frame-mounted batteries to allow in situ charging of either the bulk or conformal thin-film batteries when not in use. As discussed further below, an electrical power source of the spectacle frame may also be used to power an additional attachable lens device. Therefore, it may be advantageous in certain embodiments to include electrical power sources with increased capacity relative to other electro-active spectacles.

In order to create the electric field necessary to stimulate the electro-active lens, voltage may be delivered from the electrical power source to the electro-active lens. This may be provided by, for example, bundles of small diameter wires contained in the edges of the frames of the spectacles 100. The wires may run from an electrical power source into the an electro-active eyewear controller, such as electronic modules 112, 114, and/or one or more controller components, and to the frame edge surrounding each spectacle lens 102, 104. Wire bonding techniques, such as those used in semiconductor manufacturing, may be used to link the wires to grid elements in an optical assembly including the lenses 102, 104.

As mentioned above, the electro-active spectacles 100, operating alone, may be configured to provide a desired vision correction for a wearer or user of the electro-active spectacles 100 (e.g., near, intermediate and/or far distance vision correction). By way of further example regarding various functions of electro-active lenses, such as lenses 102, 104, in certain embodiments, a variable power electro-active field may be located over the entire lens and adjust as a constant spherical power change over the entire surface of the lens to accommodate one's working near vision focusing needs. In other embodiments a variable power field may be adjusted over the entire lens as a constant spherical power change while at the same time creating an aspherical peripheral power effect in order to reduce distortion and aberrations. In some of the embodiments mentioned above, the distance power may be corrected by way of either a single vision, multifocal finished lens blanks, or a multifocal progressive lens optic. An electro-active optical layer may be used to correct for working distance focusing, and/or other needs. It is also possible, in some cases, to utilize either a single vision, multifocal finished lens optic, or multifocal progressive lens optic for distance spherical power only and correct near vision working power and astigmatism through an electro-active layer or utilize either a single vision or multifocal lens optic to correct astigmatism only and correct the sphere power and near vision working power through an electro-active layer. Also, it is possible to utilize a plano, single vision, multifocal finished lens optic, or progressive multifocal lens optic and correct for distance sphere and astigmatism needs by way of an electro-active layer.

It should also be noted that the power correction needed, whether prismatic, spherical or aspheric power as well as total distance power needs, mid range power needs and near point power needs, can be accomplished by way of any number of additive power components. These may include the utilization of a single vision, or finished multifocal lens, optic providing all the distance spherical power needs, some of the distance spherical power needs, all of the astigmatic power needs, some of the astigmatic power needs, all of the prismatic power needs, some of the prismatic power needs, or any combination of the above when combined with an electro-active layer, will provide for one's total focusing needs.

As further shown in FIG. 1, the electro-active spectacles 100 may also include a first electronic contact 122 and a second electronic contact 124. The first electronic contact 122 may be connected to electronic module 112 and/or a electrical power source (not shown). First electronic contact 122 may be configured to communicate, for example, data and/or instructions to and from the electronic module 112, and/or to provide electrical power from the electrical power source to an attachable device. The second electronic contact 124 may be connected to electronic module 114 and/or a electrical power source (not shown), and may be configured in a similar manner to first electronic contact 122. Alternatively, the electro-active spectacles 100 may include a single electronic contact to perform the variously described functions.

Electronic module 112 and/or electronic module 114 may include manual controls, such as tactile buttons, switches and the like; automated controls, such as light, motion, and other sensors; and/or may be remotely controllable such as via RF, IR or other remote control techniques. Such controls may be configured to operate and/or adjust one or more functions provided by the spectacles 100 and/or an attachable lens unit as described further herein.

It should be noted that, although depicted as disposed on sides of the spectacle lens frames, electrical contacts, such as contacts 122, 124, may be disposed at any location on the spectacles 100 where a connection may be formed between the spectacles 100 and an attachable device. For example, lead wires, and other mechanisms, may be used to connect circuitry of the attachable device to other locations on the spectacles 100, such as directly to electronic modules 112, 114.

In embodiments, electro-active spectacles, such as spectacles 100, may include attachment mechanisms to facilitate mounting and/or detaching detachable lens devices to the spectacles. For example, spectacles 100 may include magnets in proximity to electrical contacts 122, 124, that correspond to magnets disposed on a detachable lens device. Accordingly, the magnets, and other attachment mechanisms may be used to facilitate electrical connection between the spectacles and the detachable lens device by properly positioning and joining them together. Other attachment, detachment, and/or joining mechanisms are possible, including, for example, electro-magnetic, mechanical, adhesive, etc.

Figure 2:
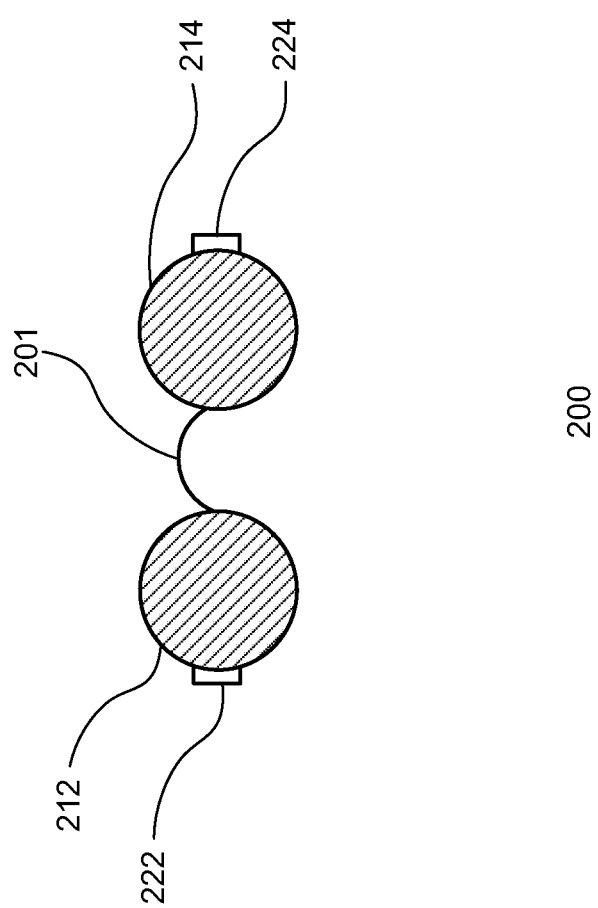
FIG. 2 depicts aspects of an exemplary attachable lens device according to an embodiment of the invention.

FIG. 2 illustrates an exemplary add-on or attachable lens device 200, which may be used, for example, in coordination with the electro-active spectacles 100 shown in FIG. 1. The attachable lens device 200 may include an electro-active lens, similar to those discussed above, and/or other features such as, for example, an electronic display, a camera, an active shuttering lens, an active polarizing lens, an electro-chromatic lens, etc. In some, but not all, cases, attachable lens units, such as attachable lens device 200, may include main lenses with plano optical power (no optical power). In embodiments where there are other features built in to the attachable lens unit, such as a display or a camera disposed within the main lens or lenses of the attachable unit, those optical devices may include their own focus lens or lenses as part of those specific devices, which may be built into the main lens, or another lens, of the attachable unit.

The attachable lens device 200 may include a frame front 201 supporting two electro-active lenses 212, 214. The attachable lens device 200 can be attached to, and/or detached from, the front of spectacles 100. The attachable lens device 200 may include a first connector 222 and a second connector 224 for attaching to the spectacles 100.

In embodiments, connectors 222, 224 may be configured to attach with a corresponding part of the spectacles, for example, using magnetic, electro-magnetic, mechanical, adhesive and other attachment mechanisms known in the art. Connectors 222, 224 may also be configured to communicate data, instructions and/or power between the attachable lens device 200 and the spectacles 100. For example, connectors 222, 224 may include electrical contacts configured to connect with the first electronic contact 122 and second electronic contact 124, respectively. Through such connections, the various functions of the attachable lens device 200 may be controlled, powered and/or communicated to the spectacles 100. It is also contemplated that, in some embodiments, an attachable lens device may include its own electrical power source, to power features of the attachable lens device and/or to provide power to spectacles.

Figure 3:
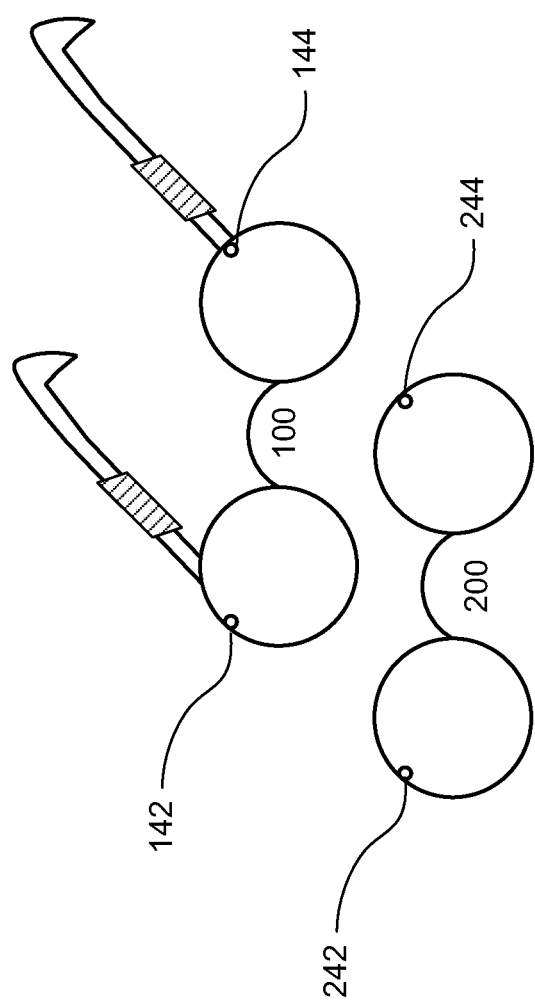
FIG. 3 depicts further aspects of an exemplary spectacle system according to an embodiment of the invention.

The attachable lens device 200 may attach over the lenses of the spectacles 100 in a cosmetically appealing and useful manner. For example, as shown in FIG. 3, attachable lens device 200 may be configured to look similar to, and attach unobtrusively, over the lenses of the spectacles 100. As also shown in FIG. 3, attachment and/or communication mechanisms may be discreetly located in the area of the lenses of the device, e.g. corresponding magnetic points 142, 242 and 144, 244.

Electro-active lenses, such as lenses 212, 214, may be configured to provide further functions to an electro-active spectacle system, including spectacles 100 and attachable lens device 200, in response to the application of electrical power, such as, for example, an electronic display, active shuttering, active polarization, electro-chromatic tinting, active magnification, etc. Attachable lens device 200 may also be configured with additional features to be used in coordination with, and/or powered by, spectacles 100, such as, for example, a still image camera, a video camera, image enhancement, etc.

Once attached to the spectacles 100, the attachable lens device 200 can receive power from, and/or be controlled by, controls of the spectacles 100 to provide, for example, a desired predetermined functionality. In embodiments, the lenses of attachable lens device 200 may include one or more lenses that provide no additional optical power or that do not contribute to the vision correction of a user. For example, the attachable lens device 200 may be configured to provide one or more functions that do not necessarily require additional vision correction of a user, e.g. providing an electronic display, active shuttering such as used for 3D applications, active polarization for eye protection, 3D viewing etc., and/or electro-chromatic tinting for eye protection, image enhancement, aesthetics, etc.

The attachable lens device 200 can be attached in a number of different ways to the spectacles 100. For example, the connection can be made magnetically and/or mechanically. Once connected to the spectacles 100, the attachable lens device 200 may be electrically coupled via any number of electrical contacts to the controlling electronics, e.g. electronics modules 112, 114, of the overall system. Any part of the attachable lens device 200 and the spectacles 100 may include one or more magnets, or other attachment mechanisms for joining with the other system to form a combined system. In various embodiments, an attachment mechanism may be included on the attachable lens device only, on the spectacles only, or on both the attachable lens device and the spectacles.

The frame front of the attachable lens device 200 may be magnetic, for example, and may be magnetically coupled or connected to a frame front of the spectacles 100. The frame front of the attachable lens device 200 may also include a mechanical clip or other device to mechanically couple the attachable lens device 200 to the spectacles 100. As discussed further below, embodiments of the invention may also include combining attachment mechanisms with mechanisms for communicating one or more of data, commands and/or electrical power between a base lens unit, such as spectacles 100, and an attachable lens unit, such as attachable lens device 200.

In embodiments, the mechanism used to attach the attachable lens device 200 to the spectacles 100 can also be used to provide a link for powering and controlling, for example, electro-active lenses of the attachable lens device 200. For example, a mechanical attachment, can provide an insulated or a non-insulated electrical connection between the attachable lens device 200 and the spectacles 100. Similarly, a magnetic attachment mechanism, such as magnets included in one or more of contacts 122, 124 and/or connectors 222, 224, can also include one or more areas near the magnetic coupling that provide electrical coupling between the attachable lens device 200 and the spectacles 100.

The attachable lens device 200 may include one or more electronic controllers that may be powered and controlled by a base lens unit, such as the spectacles 100 (e.g., in a master-slave type of control system), or can comprise only electronic control links and can be entirely dependent upon the electronic control devices of a base system. In embodiments, a base electro-active lens unit of the present invention may include all of the necessary hardware (e.g., power supplies and controlling electronics/processor(s)) and software (e.g., firmware) for operating and controlling various functionalities of an attachable lens unit, such as attachable lens device 200. For example, a base lens unit, such as the spectacles 100, may be programmed and/or programmable to provide control of functions supporting 3D viewing, electronic display, on demand electro-chromatic tinting, image enhancement, active magnification, etc.

Attachable lens devices, such as attachable lens device 200, may be configured to provide a wide range of desired enhanced functionality. According to aspects of the invention, electro-active lens systems as described herein may be configured to operate with different attachable sets of lenses for different desired functionality, and/or can use a same pair of attachable electro-active lenses to provide one or more desired modes of enhanced functionality. As an example, an attachable electro-active lens unit can include electro-chromatic lenses, e.g. the electro-active lenses may be configured to provide tunable opaqueness to operate as changeable or alterable sunglasses when attached to a base lens unit. The level or darkness provided by the electro-active lenses may be controlled and/or adjusted by electronics and associated controls of the base unit, such as spectacles 100. By way of further example, certain functions may be difficult to combine in a single compact attachable device according to the current levels of skill in the art, e.g. thermal vision enhancement and other vision enhancement devices. In embodiments, a base unit, such as spectacles 100, may be reconfigurable to support the addition of various functions into attachable devices over the course of time and evolution of related technologies.

As mentioned above, in addition to vision correction, an electro-active layer may also be configured to give a spectacle lens an electro-chromatic tint or shading. As used herein, electro-chromatic features may include and/or be provided by, for example only, electro-chromic, electronic tints, liquid crystal changeable tints, and/or dynamic tunable tints. For example, by applying a voltage to an appropriate gel polymer or liquid crystal layer, a tint or sunglass effect can be imparted to the lens, which may alter the light transmission through the lens. A reduced light intensity, or other chromatic change, may be used to give a "sunglass" or tint effect to the lens for the comfort of the user in bright, outdoor environment, or in other circumstances where a certain tint may be useful, e.g. low light conditions, or even aesthetically desirable. Liquid crystal compositions and gel polymers with high polarizability in response to an applied electric field are examples of suitable compositions for such applications.

Figure 4:
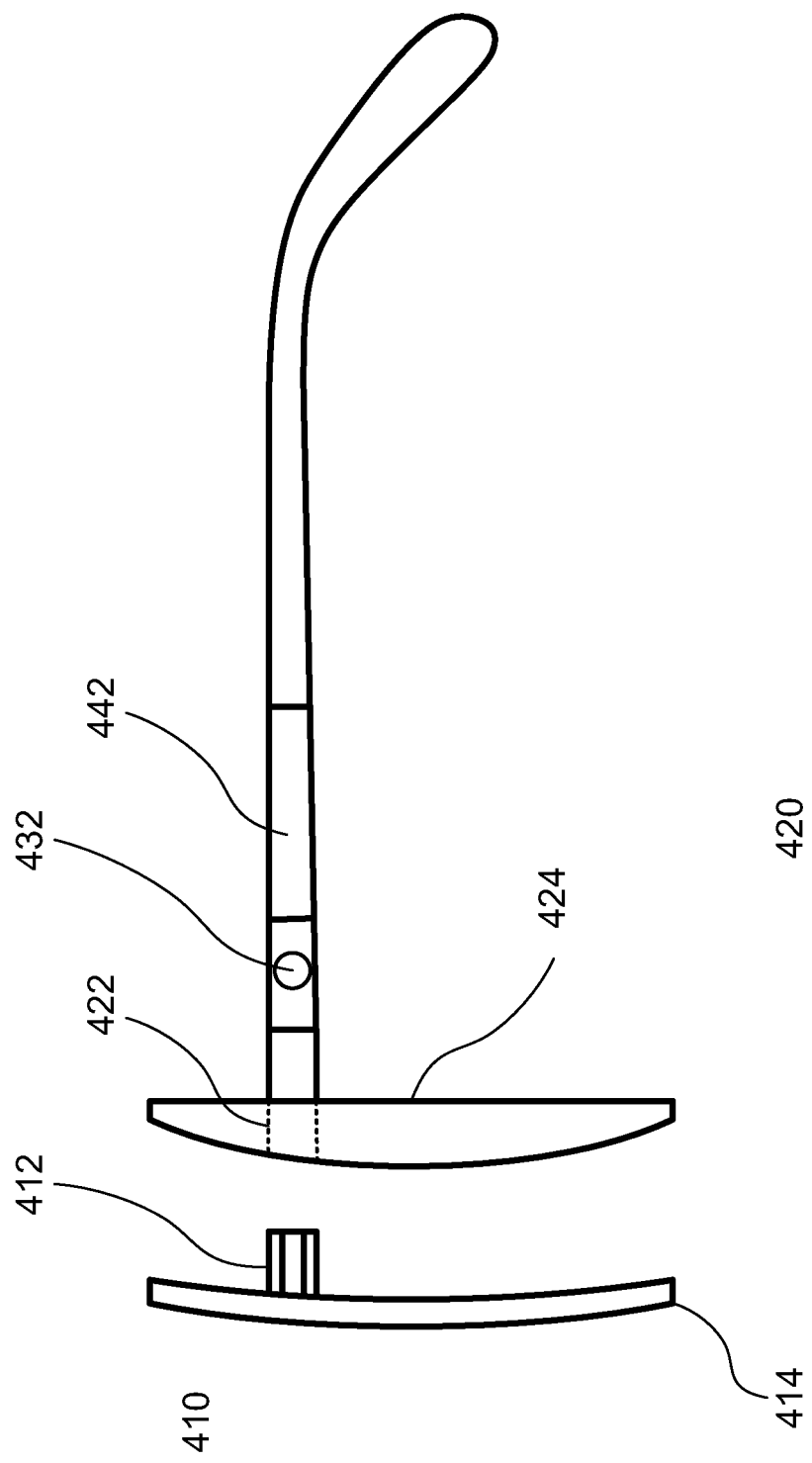
FIG. 4 depicts aspects of another exemplary spectacle system according to an embodiment of the invention.

Further details regarding an exemplary lens system, including a mechanical connection, are shown in FIG. 4. As shown in FIG. 4, an attachable lens unit 410 may include an electro-active lens 414 and a physical connector component 412 that is configured to join with a corresponding connector component 422 in spectacle frame 420. For example, connector component 412 may include a Standard, Mini, or Micro USB plug to fit with a corresponding USB socket in spectacle frame 420. The mating of the physical connectors may physically secure the attachable lens unit 410 to the spectacle frame 420, as well as allow for the communication of data, instructions and/or power between the attachable lens unit 410 and the spectacle frame 420.

As also shown in FIG. 4, spectacle frame 420 may include a tactile control 432 for controlling various electro-active functions of the attachable lens unit 410 via the connector components 412, 422. Spectacle frame 420 may also include an electro-active lens 424 and an electrical power source 442, which may be a removable and/or rechargeable battery.

Figure 5:
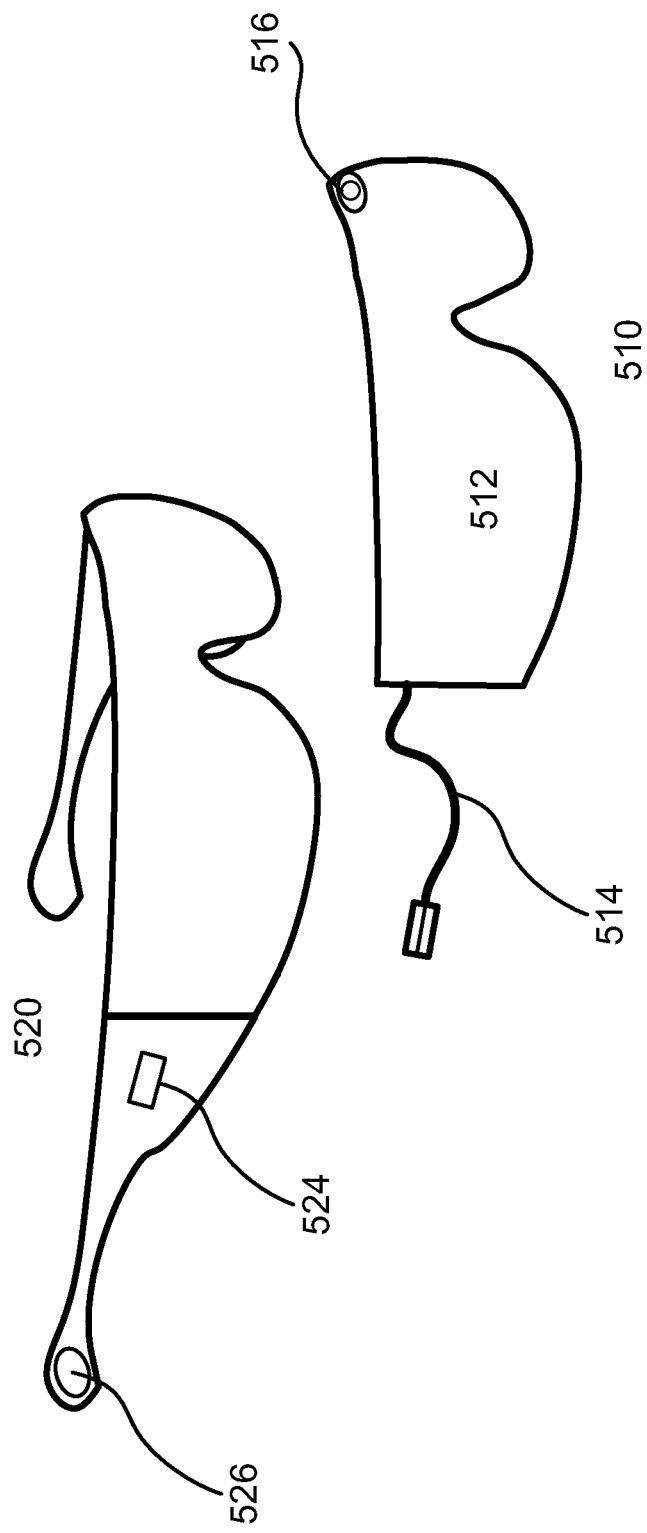
FIG. 5 depicts aspects of another exemplary spectacle system according to an embodiment of the invention.

Further details regarding yet another exemplary lens system, such as may be used in goggles and other types of differently shaped eyewear, are shown in FIG. 5. As shown in FIG. 5, an attachable lens unit 510 may be configured to cover and/or be used with a variety of eyewear of different shapes or sizes. For example, attachable lens unit 510 may be dimensioned to fit around an average spectacle size. Attachable lens unit 510 may include an electro-active lens 512 and a wired communication component 514 that is configured to join with a corresponding connector component 522 in eyewear frame 520. For example, connector component 514 may include a Standard, Mini, or Micro USB plug to fit with a corresponding USB socket in spectacle frame 520. Because communication component 514 has a length of wire attached thereto, it may be used to connect electronics, such as an electro-active lens, of attachable lens unit 510 to a variety of differently sized spectacles or other eyewear. Alternatively, attachable lens unit 510 may include a wireless receiver for receiving control signals and/or exchanging data with, a base lens unit, such as eyewear frame 520.

As also shown in FIG. 5, attachable lens unit 510 may include a camera 516 for taking pictures and/or videos of images that a user is looking at. Control signals for the camera 516 may be communicated to the attachable lens unit 510 via wired communication component 514 or other communication devices known in the art. Likewise, data signals from the camera 516 may be communicated to eyewear frame 520 via wired communication component 514 or other communication devices known in the art.

By way of further example, attachable electro-active lenses, such as may be used in attachable lens unit 510, or others described herein, may be configured to provide and/or support 3D viewing capability, e.g. by providing active shuttering, active polarization, active tinting and the like. In embodiments, attachable lens devices may be configured to detect a 3D projection, and/or a type of 3D projection, e.g. via camera 516, or other sensor included in the attachable lens device. Such detecting may be accomplished through, for example, detecting the presence of predetermined cycles of light, contrasting polarization, tint, etc. In embodiments, a 3D viewing support function may be provided and/or adjusted based on the detected 3D projection.

For example, if an active-shuttering 3D projection is detected, an active shuttering function may be provided, whereas, if a polarized projection is detected, an active polarization function may be provided. It should be noted that, the manufacture and design of various 3D lenses, including, for example, 3D shutter lenses, 3D static lenses, etc., as well as camera devices, display devices, polarized devices, electronic tinted lenses, etc. are known in the art and are not, therefore, described in extensive detail herein.

Further, as an additional example, the attachable lens devices, such as attachable lens device 200 and the like, may be configured to provide projection capabilities to allow, for example, a user to view a projected image (e.g., an e-mail, IM, or video-chat screen etc.) while simultaneously looking through the lens system. The attachable lens device 200 or the spectacles 100 may include capabilities to interact with a remote computer (e.g., through a wireless link) to provide command and control of conventional computer functions through interaction with the combined lens system of the present invention. The attachable electro-active lenses 200 can also include a miniaturized camera to provide the capability to capture and store digital video or still images.

Aspects of the present invention also enable the base lens unit, such as eyewear frame 520 to provide hearing aid capability and/or to provide radio communication capability (e.g., a wireless link to one or more remote computers or ability to receive AM/FM signals). For example, an electrical power source included in the base lens unit, e.g. eyewear frame 520, may be used to power internal or external sound amplification, and/or speakers 526, used to assist the hearing of the wearer of the base lens unit. Such configurations may be less obtrusive than other external hearing devices, provide convenient bi-aural amplification, and capitalize on the ability to include more robust electrical power sources and discreet circuitry in the eyewear frame 520. Likewise, eyewear frame 520 may include various radio reception circuitry to detect and process AM, FM, or other home network signals (e.g. home audio networks). The audio of such signals may be output by various means, including, for example, speakers (e.g. speakers 526) or external audio connection.

In certain cases the controller, and/or one or more controller components, as described herein, can be part of the pre-manufactured frame and electro-active lens assembly and then programmed at either the eyecare professional's site or some other site. The controller, and/or one or more controller components, can be in the form, for example, of a chip or a thin film and can be housed in the frame, on the frame, in the lens, or on the lens of the eyeglasses. The controller, and/or one or more controller components, can be re-programmable or not re-programmable based upon the business strategy to be implemented. In the case where the controller, and/or one or more controller components, is re-programmable, this will allow for the use of various attachable lens units, as well as repeated updating of one's prescriptions, as long as the patient or customer is happy with his or her eyeglass frames as well as the cosmetic appearance and functionality of the electro-active lenses.

In one exemplary embodiment, a controller, and/or one or more controller components, may be fabricated and/or programmed with knowledge of the user's vision correction requirements, and allow the user to easily switch between different arrays of pre-determined voltages tailored for his or her individual vision requirements. The electro-active eyewear controller, and/or one or more controller components, may be easily removable and/or programmable by the vision care specialist or technician and replaced and/or reprogrammed with a new "prescription" controller when the user's vision correction requirements change.

In any event, it is not necessary for the switch to be on the spectacles themselves. In another exemplary embodiment, the switch is in a separate module, possibly in a pocket in the user's clothing, and is activated manually. The switch could be connected to the spectacles with a thin wire or optical fiber. Another version of the switch may include a small microwave, radio-frequency, or IR short-range transmitter which sends a signal regarding switch position and/or activation to a receiver antenna mounted on the spectacle frames. In both of these switch configurations, the user may be provided with direct but discreet control over functions of the spectacles, such as the focal length variation of the electro-active spectacle lenses, as well as the attachable lens unit, such as camera, tinting and other functions.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

What is claimed is:

1. An spectacle system comprising:
a base lens unit including a first lens, a frame configured for wearing the base lens unit on a user, and a first attachment mechanism; and
an attachable lens unit including a second lens and a second attachment mechanism configured to join with the first attachment mechanism; and
a communication mechanism configured to communicate at least one of data, instructions and electrical power between the base lens unit and the attachable lens unit,
wherein, the first lens includes an electro-active lens,
the base lens unit further includes an electrical power source, and
the communication mechanism is configured to provide electrical power from the base lens unit to the attachable lens unit.

2. The device of claim 1, wherein the second lens includes an electro-active lens.

3. The device of claim 1, wherein: the second lens includes at least one of an electronic display, a camera, an active shuttering lens, and an active polarizing lens; and the communication mechanism is configured to provide instructions and electrical power from the base lens unit to the attachable lens unit.

4. The device of claim 1, wherein the second lens includes an electro-chromatic lens.

5. The device of claim 1, wherein at least one of the base lens unit and the attachable lens unit are configured to communicate with a remote computer system.

6. The device of claim 1, wherein the communication mechanism includes at least one of a Standard, Mini, and Micro USB plug.

7. The device of claim 1, wherein first attachment mechanism joins with the second attachment mechanism via a magnet, and the communication mechanism is configured to communicate electrical power between the base lens unit and the attachable lens unit via an electrical contact joined by the magnet.

8. The device of claim 1, the base lens unit is configured to provide the user with at least one of a hearing aid capability and a radio communication capability.

9. The device of claim 1, wherein the second lens is configured to provide 3D viewing capability.

10. The device of claim 9, wherein the second lens is configured to provide the 3D viewing capability based on a detected 3D projection.

11. The device of claim 10, wherein the second lens is configured to provide different 3D viewing capabilities based on different detected 3D projections.

12. An spectacle frame device comprising:
a base lens attachment mechanism configured to hold a first lens;
a removable lens attachment mechanism configured to removably join a removable lens unit including a second lens to the spectacle frame device;
a communication mechanism configured to communicate at least one of data, instructions and electrical power between the spectacle frame device and the attachable lens unit; and
an electrical power source, wherein the first lens is an electro-active lens powered by the electrical power source.

13. The device of claim 12, further comprising a control device, wherein the communication mechanism is configured to provide instructions from the spectacle frame device to the attachable lens unit.

14. The device of claim 12, wherein the second lens is an electro-active lens powered by the electrical power source.

15. The device of claim 12, wherein the communication mechanism is configured to provide electrical power from the spectacle frame device to the attachable lens unit.

16. The device of claim 15, further comprising a control device, wherein the communication mechanism is further configured to provide instructions from the spectacle frame device to the attachable lens unit.

17. The device of claim 16, wherein the communication mechanism is further configured to receive data from the attachable lens unit.

18. The device of claim 12, wherein the frame is configured to support a second lens that provides a 3D viewing capability.

19. The device of claim 18, wherein the second lens is configured to provide the 3D viewing capability based on a detected 3D projection.

20. The device of claim 19, wherein the second lens is configured to provide different 3D viewing capabilities based on different detected 3D projections.

* * * * *